March 7, 1950 D. FRANSEN ET AL 2,499,485
ECCENTRIC DRIVE
Filed April 10, 1948
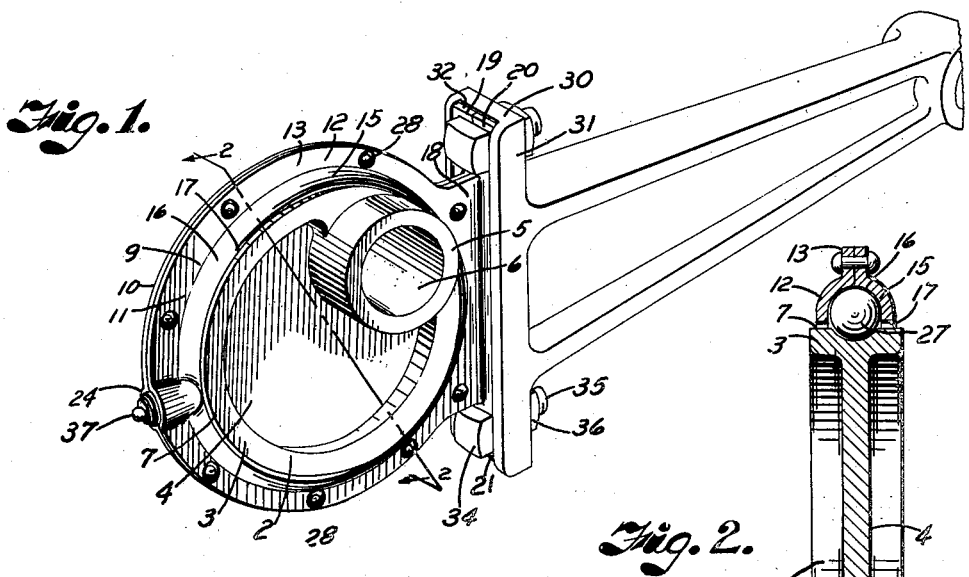
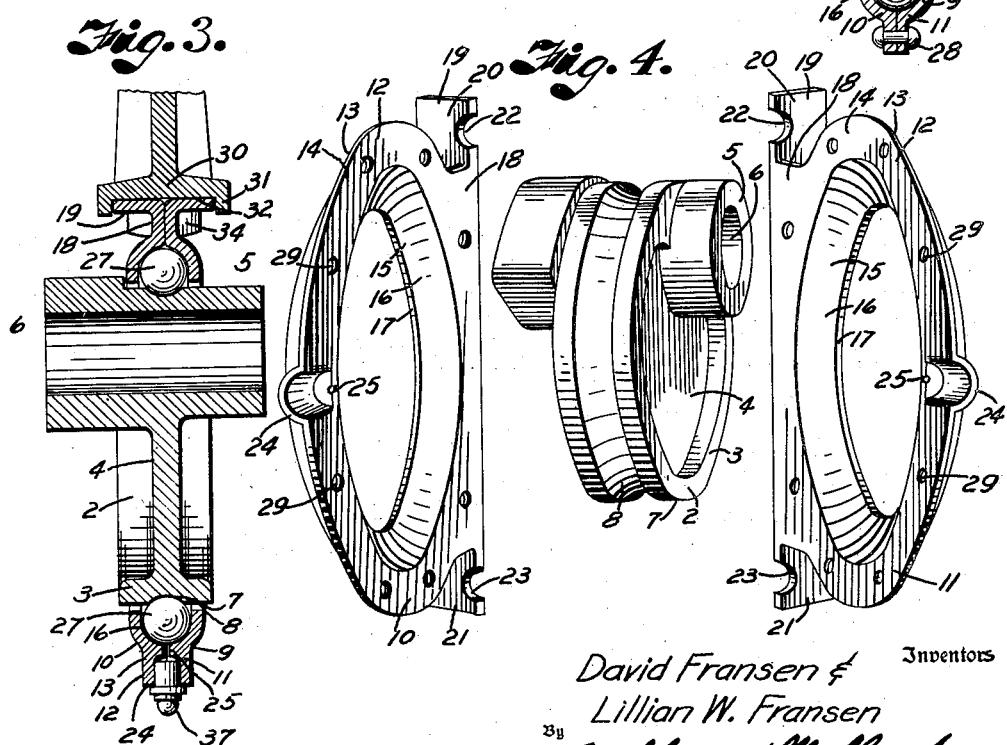
Inventors
David Fransen &
Lillian W. Fransen
By Fishburn + Mullendore
Attorney Patented Mar. 7, 1950

2,499,485

UNITED STATES PATENT OFFICE 2,499,485

ECCENTRIC DRIVE

David Fransen and Lillian W. Fransen,
Wichita, Kans.

Application April 10, 1948, Serial No. 20,288

5 Claims. (Cl. 74—570)

1

This invention relates to eccentric drives for changing rotary motion to reciprocatory motion. Such devices are subject to rapid wear when in service under loads at relatively high speeds and under dusty and dirty conditions, for example, the eccentrics used in operating the shaker or grain shoe of a separator, combine or similar machine. Usually such eccentrics have wood bearing blocks for inexpensive construction and therefore wear rapidly so that they throw the shoe out of alignment and if not corrected, result in expensive repairs.

It is, therefore, a principal object of the present invention to provide an eccentric which may be inexpensively constructed and which is of strong, rugged construction capable of withstanding the thrust and wear to which such eccentrics are subjected.

Other objects of the invention are to provide an eccentric having a strap adapted to be formed of metal sections; to provide an eccentric incorporating a substantially large, long-wearing anti-friction bearing; to provide a secure and rigid connection of the eccentric with the connecting rod; and to provide an eccentric structure that is adapted for replacement of the wood block type of eccentric strap with which most separators and combines are equipped.

In accomplishing these and other objects of the invention we have provided improved structure, the preferred form of which is illustrated in the accompanying drawing wherein:

Fig. 1 is a perspective view of an eccentric embodying the features of the present invention and showing attachment to a conventional rod or pitman.

Fig. 2 is a cross section on the line 2—2 of Fig. 1.

Fig. 3 is a cross section through the eccentric taken on the longitudinal center of the pitman.

Fig. 4 is a perspective view of parts of the eccentric shown in disassembled spaced relation to better illustrate the construction thereof.

Referring more in detail to the drawings:

1 designates an eccentric including a driving member 2 having a circular rim 3 that is connected by a web 4 with an eccentrically located hub 5. The hub 5 has a bore 6 for passing a shaft (not shown) to mount the eccentric. The eccentric may be driven by the shaft through provision of appropriate connection between the hub and shaft or by a sprocket or gear that is adapted to be secured to one end of the hub, the hub being suitably shaped to correspond with the hub of the driving gear.

The rim is relatively wide and has a substantially cylindrical face 7 in which is provided a groove 8 of substantially arcuate cross section to cooperate with the registering groove in an eccentric strap 9.

2

The eccentric strap 9 constitutes the principal feature of the present invention and comprises complementary sections 10 and 11 adapted to be formed as metal stampings so as to provide a strong, light-weight structure capable or withstanding the thrust under operating conditions to which eccentrics are subjected. The sections 10 and 11 are of identical construction to avoid the necessity of separate dies in making the respective sections. Each section, therefore, includes a ring-like plate portion 12 having substantially flat faces 13 and 14 encircling an outset annular flange 15 which is pressed outwardly from the plane of the ring-like plate portion and which curves outwardly and then inwardly toward the axial center of the ring-like plate portion to provide one-half of an outer race groove 16 adapted to encircle the rim groove 8 of the driving member.

The offset flange has an inner diameter to pass freely over the periphery of the rim portion of the driving member and leave slight clearance as shown in Fig. 3 when the parts are assembled as later described. The plate portion 4 of each section has a transverse extension 18 in a plane thereof which terminates in a laterally extending flange 19 having projecting ends 20 and 21 provided with notch-like openings 22 and 23 that are formed on the sides from which the flanges are turned. The opposite diametrical side of the substantially flat portion of each section is provided with a radial offset 24 of substantially semi-circular cross section and which connects with the groove 16 through a notch-like port 25.

27 designates a plurality of anti-friction members such as balls having a diameter corresponding with the cross sectional radius of the grooves in 8 and 16 for retaining the eccentric strap on the driving member. The complementary sections comprising the eccentric strap are assembled on the driving member and secured together by suitable fastening means such as rivets 28 that extend through openings 29 in the plate portions of the sections.

In assembling the parts, one of the complementary sections is passed over the rim of the driving member and the groove formed between the offset flange therein and the groove of the driving member are registered to permit reception of the balls which are inserted therein to form a circular series about the driving member. The other complementary section is turned reversely to the first section so that the flanges thereof are on the same diametrical sides to seat the face 19 thereof against the face 19 of the section which has been previously applied for closing the open side of the groove and to retain the balls as shown in Fig. 3. The rivets 28 are then applied through the openings 29 and the shanks are riveted over to cooperate with heads thereon in clamping the sections together as shown in Fig. 2. When thus assembled, the flanges 19 form a base having a width and length for attachment to the rod or pitman adapted to be actuated by the eccentric.

In the illustrated instance, the connecting rod has a transverse foot flange 30 at the end of which are laterally projecting ribs 31 to provide a substantially channel-shaped seat 32 between which the base flange of the eccentric ring is seated. The ends of the foot flange with openings 33 adapted to register with the openings formed by the registering notches 22 so that the eccentric strap may be secured upon insertion of fastening devices such as bolts 34 having threaded shanks 35 adapted to be projected through the registering openings with the heads seating against the ends of the base flange. The ends of the bolts project from the opposite side of the footing flange to accommodate nuts 36 by which the bolts are drawn up to retain the eccentric strap in rigid connection with the pitman as shown in Fig. 1.

A suitable lubricant fitting 37 is pressed into the recess formed by the sockets 24 and by which a suitable lubricant may be forced into the bearing groove and around the anti-friction balls as shown in Fig. 3.

When the eccentric constructed and assembled as described is used as a replacement for the customary wood block type of eccentric strap, the bolts which secure the wood blocks to the footing flange of the pitman are removed from the channel-shaped seat 32. The assembled unit is then connected with the connecting rod.

From the foregoing it is obvious that I have provided an eccentric mechanism of simple and inexpensive construction and which may be strongly made to withstand the thrusts to which such eccentrics are subjected. It is also obvious that the sections of the eccentric strap form the outer race of the anti-friction bearing and the two-part construction thereof permits ready assembly and insertion of the anti-friction balls.

What we claim and desire to secure by Letters Patent is:

1. An eccentric strap comprising complementary sections each having substantially ring-like plate portions in face to face registry and having laterally offset inner peripheries forming an annular race for antifriction members, each plate portion having extensions in the plane thereof and terminating in laterally opposed flanges, said flanges having ends provided with registering notches for forming openings when the flanges are placed together with the notches in registry to allow passage of attaching devices for securing the eccentric strap to a rod, and fastening devices extending through said plate portions for securing the sections together.

2. An eccentric strap comprising complementary sections each having substantially ring-like plate portions in face to face registry and having laterally offset inner peripheries forming annular flanges on the respective sides of an annular groove adapted for containing antifriction members, each plate portion having extensions in the plane thereof and terminating in laterally opposed flanges, said flanges having ends provided with registering notches for forming openings when the flanges are placed together with the notches in registry to allow passage of attaching devices for securing the eccentric strap to a rod, and rivets extending through said plate portions for securing the sections together.

3. An eccentric strap comprising complementary sections each having substantially ring-like plate portions in face to face registry and having laterally offset inner peripheries forming an annular groove for antifriction members, each plate portion having extensions in the plane thereof and terminating in laterally opposed flanges, said flanges having ends projecting from the extensions and provided with notches for forming openings when the flanges are placed together with the notches in registry to allow passage of attaching devices adapted for securing the eccentric strap to a rod, and fastening devices extending through said plate portions for securing the sections together, said ring-like plate portions having complementary radial offset portions for forming a socket in connection with said groove to accommodate a lubricant fitting.

4. In combination with a rod member having a transverse foot portion provided with a substantially channel-shaped seat, and openings at the ends of said seats, an eccentric strap including complementary ring-shaped sections having inner peripheries forming a ball groove and having portions provided with lateral flanges seated in said channel-shaped seat and having outer edges engaging sides of said channel-shaped seat to retain said portions of the sections together, said sections being provided with openings registering with the openings in said seat, fastening devices connecting said section together in cooperation with said channel-shaped seat, and fastening devices extending through said registering openings to retain the flanges in said channel-shaped seat and to connect the eccentric strap with said rod member.

5. In combination with a rod member having a transverse foot portion provided with a substantially channel-shaped seat, an eccentric strap including complementary ring-shaped sections having substantially flat plate portions and laterally offset inner peripheries forming a ball groove and having extensions in the plane of said plate portions terminating in opposed lateral flanges engaged in said channel-shaped seat with edges of said flanges engaging sides of the channel-shaped seat to retain said sections in face to face contact, fastening devices connecting said plate portions together, and fastening devices extending through said flanges and through said foot portion of the rod to retain said flanges in said channel-shaped seat and to connect the eccentric strap with said rod.

DAVID FRANSEN.
LILLIAN W. FRANSEN.

REFERENCES CITED

The following references are of record in the file of this patent:

UNITED STATES PATENTS

| Number | Name | Date |
|---|---|---|
| 288,058 | Hollister | Nov. 6, 1883 |
| 596,678 | Heath | Jan. 4, 1898 |
| 1,909,747 | Bohn | May 16, 1933 |

FOREIGN PATENTS

| Number | Country | Date |
|---|---|---|
| 22,668 | Great Britain | Oct. 28, 1898 |